UNITED STATES PATENT OFFICE.

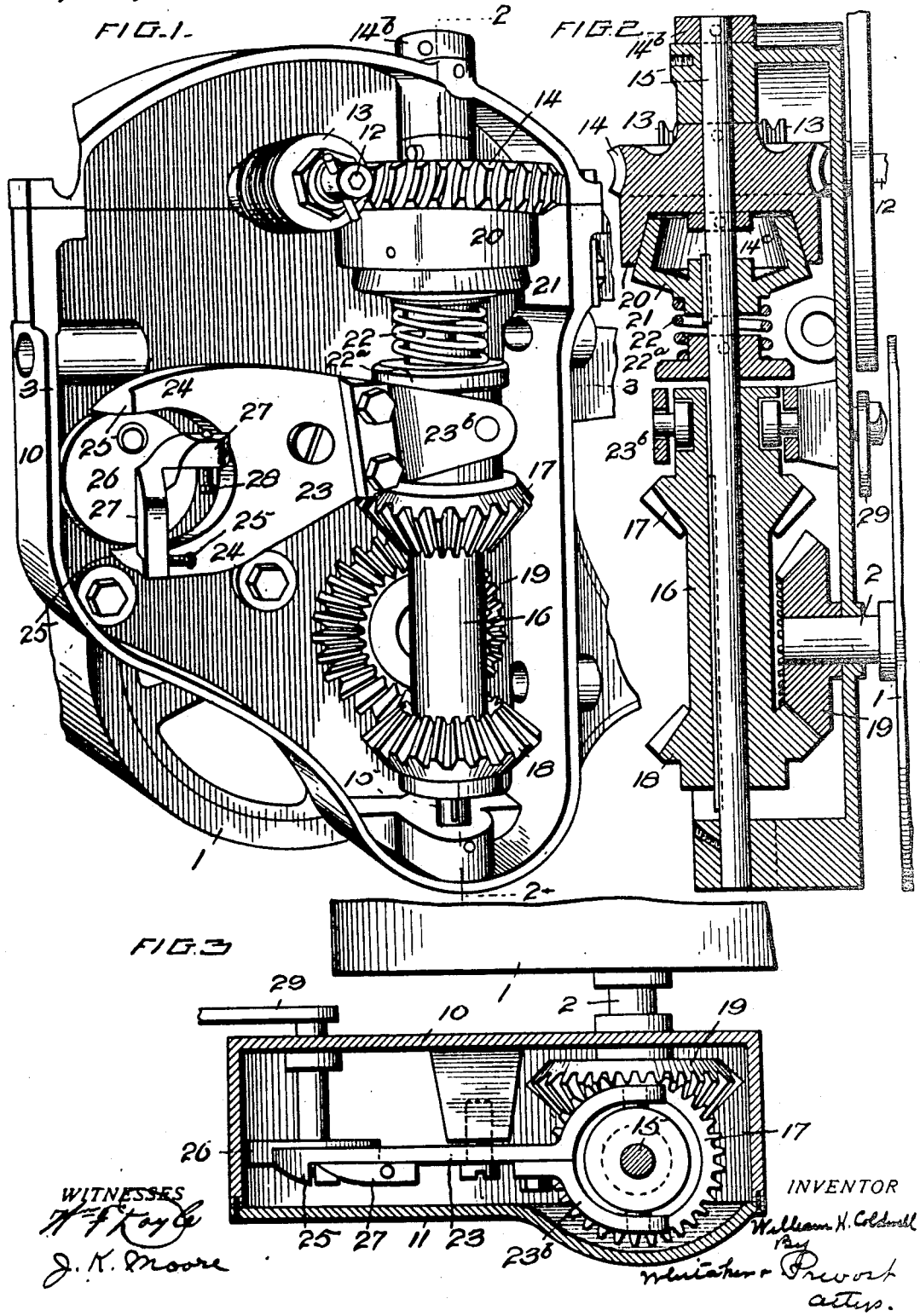

WILLIAM H. COLDWELL, OF NEWBURGH, NEW YORK.

SHIFTING MECHANISM FOR GEARING.

1,116,017.  Specification of Letters Patent.  Patented Nov. 3, 1914.

Original application filed January 19, 1912, Serial No. 672,240. Divided and this application filed April 10, 1913. Serial No. 760,162.

*To all whom it may concern:*

Be it known that I, WILLIAM H. COLDWELL, a citizen of the United States, residing at Newburgh, in the county of Orange and State of New York, have invented certain new and useful Improvements in Shifting Mechanism for Gearing; and I do hereby declare the following to be a full, clear, and exact description of the invention, such as will enable others skilled in the art to which it appertains to make and use the same.

My invention consists in the novel features hereinafter described, reference being had to the accompanying drawing which illustrates one embodiment of the invention selected by me for purposes of illustration, and the said invention is fully disclosed in the following description and claims.

Referring to the said drawings, Figure 1 represents a perspective view of a driving gearing applied to a traction roller and provided with the improved shifting mechanism which constitutes my present invention, the cover plate which is used to inclose the gearing and shifting mechanism being removed. Fig. 2, is a vertical sectional view on line 2—2 of Fig. 1. Fig. 3 is a horizontal sectional view on line 3—3 of Fig. 1.

The object of my invention is to provide a shifting mechanism for a movable part, especially well adapted for use in reversing the position of a gear member forming a part of a reversible driving mechanism, for example, wherein I employ an eccentric and a movable device, preferably so constructed as to engage the eccentric on opposite sides thereof, suitable means being provided for oscillating the eccentric. Means are also provided for limiting the oscillations of the eccentric at two opposite positions in which the diameter of the eccentric which passes through its axis of oscillation will be substantially in alinement with the points of engagement between the eccentric and the movable device, whereby the eccentric will positively lock the movable device when in its extreme positions, and as a matter of fact, will lock it in any position of the eccentric as the slight leverage offered by the eccentric will not be sufficient to overcome the frictional resistance of the pivotal connection of the eccentric, and of the actuating means connected therewith.

In the embodiment of my invention which I have selected for purposes of illustration and which is shown in Figs. 1, 2 and 3 of the accompanying drawings, 12 represents the driving member, or shaft, which may be the driving shaft of a high speed explosive engine, or electric motor or a shaft driven in any desired manner. The driving shaft 12 has its end preferably extended into a gear casing 10, as shown, the rear wall of which is provided with one of the bearings for the shaft, but I do not limit myself to the use of a gear casing. The driving shaft 12 is preferably provided with a worm 13 secured thereto and engaging the teeth of a horizontally disposed worm wheel 14 mounted loosely on a vertically disposed connecting shaft 15 and held in position by suitable collars 14$^b$ and 14$^c$ secured to the shaft. The vertical shaft 15 is mounted in bearings in the walls of the gear casing, and a continuously engaged friction clutch is employed for connecting the worm wheel 14, with the shaft 15. In the present instance I have shown a cone clutch, the female member 20 of which is formed with or secured to the worm wheel 14, and a male member 21 is mounted on a spline so as to turn with the shaft 15 but to be capable of movement longitudinally thereof. A spring 22 surrounds the shaft 15 and is interposed between the male clutch member 21, and a collar 22$^a$ adjustably secured to the shaft, thus normally holding the clutch members in frictional engagement, but permitting slippage when the load overcomes the frictional resistance of the clutch, which latter can be varied by adjusting the tension of the spring by means of the collar 22$^a$.

2 represents the driven shaft, here represented as the shaft of a traction roller 1, a portion of which is shown in the drawing. The shaft 2 is perpendicular to the shaft 15 and extends into the gear casing within which it is provided with a bevel gear 19. The shaft 15 is provided with two bevel pinions 17 and 18 secured to a sleeve 16, which is connected to shaft 15 by a spline so as to rotate therewith but is capable of movement longitudinally of the shaft. The pinions 17 and 18 are preferably at such a distance apart that in a median position of the sleeve neither pinion will engage the bevel gear 19, in which position the shaft 15 may be rotated without driving the shaft 2.

23 represents a shifting lever located in the gear casing and pivoted substantially centrally, said lever being provided at one end with a yoke 23ᵇ pivotally connected to a collar, rotatable on but secured to move endwise with said sleeve, the other end of said lever being bifurcated and forming arms indicated at 24, 24, each of said arms being provided with a stop or projection 25.

26 represents an eccentric or cam, mounted within the gear case on a short shaft, and located between and with its peripheral surface in contact with the arms 24, 24. The cam or eccentric has formed integrally with or secured to it stop arms 27, 27, each of which is preferably provided with an adjusting screw 28 adapted to engage the adjacent stop or projection 25. These screws are adjusted to stop the movement of the shifting lever in each direction when one or other of said pinions 17, 18 has been placed accurately in mesh with the bevel gear 19, thus insuring the gearing meshing easily without undue wear or strain. As the exterior surface which engages the arms 24, 24 is circular the lever 23 will be maintained in any position to which it may be adjusted, without the necessity of any extraneous locking or securing mechanism, that is to say, in the extreme positions of the eccentric 26, the points of engagement of the arms 24, 24 thereof will be in a line with a diameter of the eccentric passing through its pivotal axis, so that the arms will be unable to exert any influence on the eccentric which would tend to move the same and even in intermediate positions of the eccentric, the slight leverage which the arms would have upon the eccentric would not be sufficient to overcome the frictional resistance of the pivotal connection, and that of the actuating mechanism connected with the eccentric. In other words, the reversing mechanism is self locking in whatever position it is placed. The shaft of the eccentric 26 (or the eccentric itself) is provided with an operating arm 29 which may be actuated by hand or in any desired manner, and by means of this arm, the sleeve 16 can be moved to hold the pinions 17, 18 out of engagement with the gear 19 (the median position) or to throw either of said pinions into engagement with the gear, and thus drive the shaft 2 in either direction.

The gear case is preferably fitted with a cover 11 and is filled with lubricant which may be in a liquid or semisolid condition, thus keeping all the parts thoroughly lubricated.

The specific form of driving mechanism herein shown and described is not specifically claimed herein as the same forms the subject matter of my former application, Serial No. 672,240, filed January 19, 1912, of which this application is a division.

What I claim and desire to secure by Letters Patent is.

1. The combination with a movable gear member, of an oscillatable eccentric, a movable non-rotatable shifting device independent of, but operatively connected with said gear member and having bifurcated portions for simultaneously engaging said eccentric on opposite sides of its axis of oscillation, and means for oscillating said eccentric, said eccentric and said shifting device being provided with coacting stops for limiting the oscillating movement of the eccentric, whereby the gear member will be adjusted exactly in relation to the gear members which it is to engage.

2. The combination with a movable gear member, of an oscillatable eccentric, a pivoted shifting device operatively connected with said gear member and having bifurcated portions for simultaneously engaging said eccentric on opposite sides of its axis of oscillation, and means for oscillating said eccentric, said eccentric and the bifurcated portions of said shifting device being provided with coacting stops for limiting the oscillating movement of the eccentric, said coacting stops being adjustable, the one with respect to the other, whereby the gear member will be adjusted exactly in relation to the gear members which it is to engage.

3. The combination with a movable gear member, of an oscillatable eccentric, a pivoted shifting device operatively connected with said gear member, and having bifurcated portions engaging the eccentric on opposite sides of its axis of oscillation, a projecting stop on each of said bifurcated portions, a pair of stop arms connected with said eccentric, and adjusting screws carried thereby for engaging the stops on the bifurcated portions of the shifting device.

In testimony whereof I affix my signature, in the presence of two witnesses.

WILLIAM H. COLDWELL.

Witnesses:
R. C. LUDLAM,
D. U. GIDDINGS.